Sept. 3, 1957    J. W. BRASWELL    2,804,977
APPARATUS FOR REGENERATING DOMESTIC WATER SOFTENING TANKS
Filed March 12, 1954

INVENTOR.
JOHN W. BRASWELL
BY
ATTORNEY

2,804,977

APPARATUS FOR REGENERATING DOMESTIC WATER SOFTENING TANKS

John W. Braswell, Bonne Terre, Mo.

Application March 12, 1954, Serial No. 415,865

2 Claims. (Cl. 210—95)

This invention pertains to the art of regenerating water softening tanks used in domestic water softening systems. An object of this invention is to provide improved apparatus for such a purpose, and an improved method of carrying out the regenerating operation by the use of such apparatus.

In accordance with this invention, generally stated, the tank to be regenerated is disconnected from the domestic system and connected to the apparatus of this invention. That apparatus includes a regenerating receiver mounted above the service tank and connected thereto by a conduit of transparent plastic or the like so that the flow through said conduit may be visible. A washing solution is forced into the service tank to flow therethrough in the direction reverse to that of the normal flow when in operation. This flow flushes the mineral in the service tank upward into the receiver, thereby loosening the mineral and washing it to remove sediment. The receiver has an outflow conduit connected to the top thereof. This outflow conduit is also transparent so that the degree of turbidity of the effluent may be examined visually. This effluent from the first washing operation is conducted to a drain. When visual inspection shows a sufficiently clear effluent, the connections are changed by suitable valves so as to reverse the flow through the receiver thereby flushing the mineral back into the service tank. When this operation is complete, another change of valves supplies a brine solution of measured concentration to the service tank to rejuvenate the mineral therein. The effluent from this operation is stored. The brine treatment is timed as required by the condition of the tank, and at the end thereof, the mineral is rinsed with clear water and the effluent from this washing operation is stored with that of the previous one. The service tank is then disconnected and is ready for return to domestic service. A succeeding tank to be regenerated is connected to the system, and the effluent stored from the last two operations described above is used for the first washing operation. In this way, a great saving of both water and brine is accomplished.

A preferred embodiment of this invention is shown in the accompanying drawings, in which—

Figure 1:
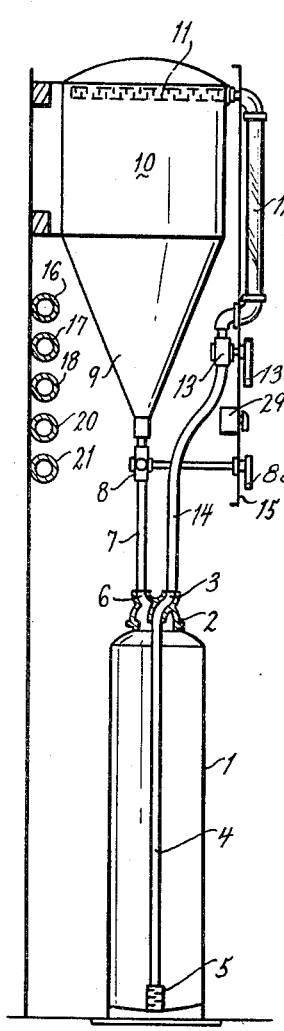
Fig. 1 is a side view with parts in section of an installation of a system of apparatus in accordance with this invention and adapted for carrying out the method thereof.

Referring to the drawing, 1 designates a water softening service tank for use in a domestic system. This tank is provided with a top fitting 2 such as described in application, Serial No. 260,693, filed December 8, 1951, now Patent No. 2,681,147, dated June 15, 1954. This fitting has an outlet 3 which is the outlet during its normal operation in the water softening system. The outlet 3 connects with a central pipe 4 extending to the bottom of the tank 1 and opening into said tank through a strainer 5. The fitting 2 also has an inlet opening 6 connecting with a passage surrounding and concentric with the tube 4 and connecting with the interior of the tank 1.

The fitting 2 has its outlet 6 connected by a hose or conduit 7 of transparent plastic or the like, connected through a valve 8 to the lower cone of funnel 9 of a receiver 10. In the upper portion of the receiver 10, a slotted tube 11 providing a strainer is connected with an outlet conduit 12 which is also of transparent material so that the liquid flowing therethrough may be visible. The conduit 12 connects through a valve 13 to another transparent plastic hose 14 which is connected to the outlet 3 of the fitting 2.

Mounted in front of the receiver 10 is a panel 15 of any suitable material, and the conduit 12 is mounted on the front of said panel, as are also the valve handles 8a, for the valve 8 and 13a for the valve 13. Control devices, which will be described hereinafter, may also be mounted on this panel.

Figure 2:
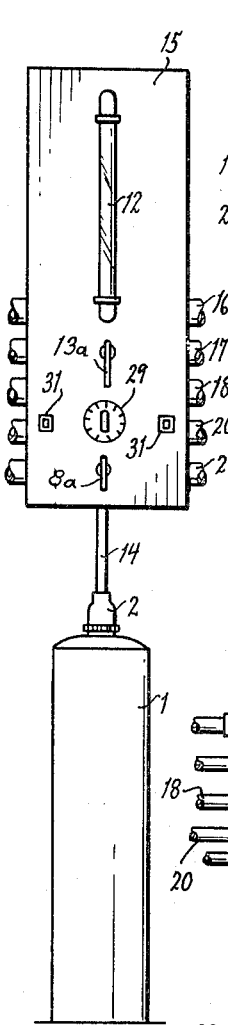
Fig. 2 is a front view of one panel of the system.

A series of units, as described above, may be mounted side by side in a row so that any desired number of service tanks may be handled. A system of piping for handling the various liquids may be mounted to run along behind the row of panels as indicated in Figs. 1 and 2. These may include a pipe 16 for city water, a pipe 17 supplying a saturated solution of brine, a pipe 18 connected to a pump 19, which in turn is connected to a storage tank, not shown, for the effluent of the first washing operation. There may also be provided a pipe 20 for conducting that effluent to the storage tank of any well known type, not shown, and a pipe 21 leading to a drain.

When the rejuvenating operation is started, there is a suitable supply of fluid in the effluent storage tank. When the tank 1 has been connected, as described, the valves 8 and 13 are set in the positions shown in Fig. 3. The valve 8 is a 4-way valve, which when set in the position shown is opened to permit flow from the hose 7 upward into the funnel 9. The side opening in the plug of the valve 8 connects with a closed passage in this position, as will be described later. The valve 13 is a 5-way valve, which when in the position shown in Fig. 3 connects the effluent conduit 12 with the drain pipe 21 and connects the pipe 18 from the pump 19 to deliver the discharge of that pump via the pipe 22 through a flow-control regulator 50, to the conduit 14 which leads it into the outlet 3 of the fitting 2. The regulator 50 prevents surges, establishes a uniform rate of flow, and insures equal flow to each of several tanks being serviced at the same time.

It will be seen that with the valves in this position, the pump 19 forces the fluid from the storage tank via the pipe connection 22 through the valve 13 and the conduit 14 into the pipe 4 of the tank 1. The liquid delivered to the tank in this way is the effluent from the final washing operations on the preceding tank. It passes in reverse direction downward through the pipe 4 and upward through the conduit 7 into the funnel 9. This washing operation is continued for a predetermined period of time during which the mineral is agitated both in the tank and in the receiver 10 and is thoroughly rinsed of all sediment. The progress of the operation may be observed by examining the liquid passing through the conduit 12. This is the discharge from the receiver 10 and passes through the valve 13 to the drain 21. As the washing operation progresses, the liquid flowing through the conduit 12 is gradually clarified. An operator soon learns by experience when this liquid is clear enough to terminate this operation.

Figure 3:
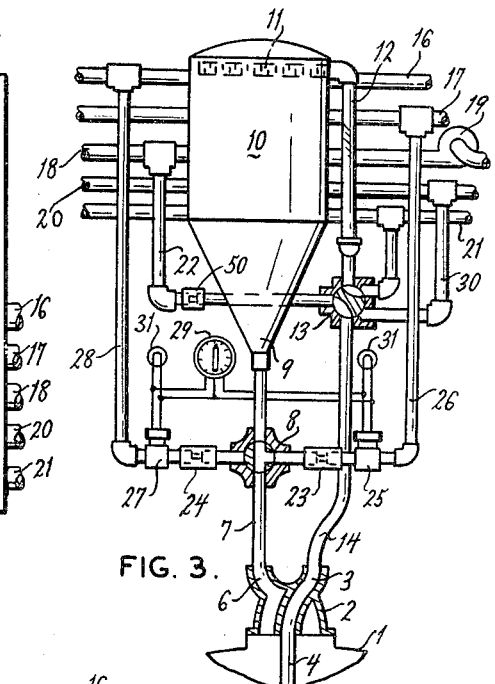
Fig. 3 is a diagrammatic view of the system as set for the first washing operation.
Figure 4:
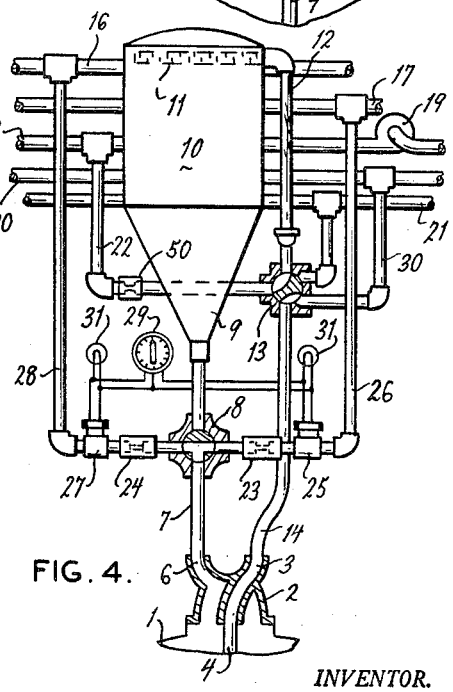
Fig. 4 is a view similar to Fig. 3, showing the setting for the brine treatment and final rinsing.

When this point has been reached, the valve 13 is moved to the position shown in Fig. 4, while the valve 8 remains in the position of Fig. 3. This change in the valve 13 connects the effluent pump line 18 via the pipe 22 and the regulator 50 with the conduit 12 thereby reversing the flow through the receiver 10 and the tank 1. This causes the mineral in the receiver to be washed back into the tank 1. During this operation, it is important to avoid lodgment of some of the mineral in the funnel. In order to avoid this, the cone 9 is made of such shape that the angle between an element of the cone and its axis is not greater than 25°. It has been found that this insures complete return of the mineral during this operation. This fact can be determined visually by examination of the flow through the conduit 7.

The valve 8 is then turned to the position of Fig. 4. The side outlets of this valve are connected through two regulators 23 and 24. These may be alike, and are designed and adjusted to impose the same rate of flow under normal operating conditions set up by the system and it has been found in practice that a rate of flow of one gallon per minute is proper for this process. One of these regulators may be simply a fitting having a restricted passage which, under the pressure applied, limits the flow to the desired value. The regulator 23 is connected through a solenoid valve 25 to a pipe 26 which leads to the brine supply pipe 17. On the other side of the valve 8 the regulator 24 is connected to a similar solenoid valve 27 which in turn connects through a pipe 28 to the clear water supply pipe 16. The solenoid valves 25 and 27 are normally closed until energized by a timing device 29 which connects them to a suitable circuit. When the valve 8 has been set to the position of Fig. 4, the timing device 29 is set to the desired time interval as determined by experience. This opens both the valves 25 and 27 and permits simultaneous flow to the valve 8 from the brine supply and the clear water supply. Since the regulators 23 and 24 enforce the same rate of flow into both sides of the valve 8, the resultant liquid which flows into the conduit 7 is a half-and-half solution of brine; that is, the saturated solution diluted by its own volume of clear water. This brine solution passes into the inlet 6 of the tank 1 to provide the brine treatment for rejuvenating the mineral in the tank. The effluent from the tank passes out by the conduit 14 and is directed by the valve 13 to a pipe 30 which is connected to the effluent storage pipe 20. The timer 29 operates to close the valve 25 after a predetermined time interval. This shuts off the brine, but the flow of clear water continues so as to give the mineral in the tank 1 a final rinsing. The effluent still flows out of the tank to the pipe 20 to be delivered to the effluent storage tank. This rinsing operation continues until the timer returns to its zero position. At this position, the valve 27 is also closed and the rejuvenating operation is complete. The valves 25 and 27 may, if desired, be provided with signal lamps 31 to indicate when they are in operating position.

It has been found that by proper adjustment of the time interval, set by the timer 29, which interval includes the brine treatment and the final rinsing with clear water, a sufficient amount of effluent can be passed into the storage tank to provide just enough washing fluid to take care of the first washing operation on the succeeding service tank. This has accomplished a very considerable saving in the amount of water used and an improvement in the efficiency of the first washing operation.

Various changes may be made in the details of construction, within the scope of the appended claims, without departing from the spirit of this invention. Parts of the invention may be used without the whole and improvements may be added while retaining some or all of the advantages of the invention.

I claim:

1. An apparatus for rejuvenating water-softening service tanks, comprising; an operating panel mounted in upright position above the tank to be rejuvenated; a rack of pipes mounted in rear of said panel providing, respectively, a source of fresh water, a source of brine solution, a connection having a pump in series therewith to a storage reservoir, a conduit for carrying effluent to the reservoir, and a drain pipe; a receiver mounted in rear of said panel above the tank; an outlet conduit from the upper portion of said receiver having a transparent section mounted on the front of said panel; a four-way valve connected to said water-source pipe, said brine pipe, said receiver and the outlet of the tank; a five-way valve connected to said pump connection, said effluent conduit, said outlet conduit, said drain pipe and the inlet of the tank; and a manipulating element on the front of said panel connected to operate each of said valves.

2. An apparatus in accordance with claim 1 having shut-off valves in said water-source connection and said brine connection to said four-way valve, and timing means operating to close first said shut-off valve in said brine connection and after a timed interval to close said shut-off valve in said water-source connection.

References Cited in the file of this patent

UNITED STATES PATENTS

| | | |
|---|---|---|
| 1,704,925 | Robertson | Mar. 12, 1929 |
| 1,763,783 | Hodkinson | June 17, 1930 |
| 2,046,265 | Hewetson | June 30, 1936 |
| 2,077,003 | Nash | Apr. 13, 1937 |
| 2,252,065 | Culligan | Aug. 12, 1941 |
| 2,628,192 | Ziegelman | Feb. 10, 1953 |
| 2,682,268 | Ryan et al. | June 29, 1954 |